United States Patent [19]
Lee

[11] Patent Number: 5,333,821
[45] Date of Patent: Aug. 2, 1994

[54] DEVICE FOR MOUNTING AN INDUCED-DRAFT FAN PIPE ON AN ELECTRIC SOLDERING IRON

[76] Inventor: A-Ying Lee, 19, Lane 156, Sec. 1, Ling-Yun Rd., Wu-Ku Village, Taipei, Taiwan

[21] Appl. No.: 73,483
[22] Filed: Jun. 9, 1993
[51] Int. Cl.$^5$ .............................................. F16L 3/00
[52] U.S. Cl. .................................. 248/52; 248/316.7; 219/230
[58] Field of Search .................. 248/52, 51, 53, 65, 248/74.1, 316.1, 316.7, 300; 219/230

[56] References Cited

U.S. PATENT DOCUMENTS

| | | | |
|---|---|---|---|
| 1,215,693 | 2/1917 | Orme | 219/230 X |
| 1,282,040 | 10/1918 | Bullock | 248/52 |
| 2,205,139 | 6/1940 | Gunderson | 248/52 |
| 2,243,554 | 5/1941 | Epstein | 248/316.7 X |
| 2,876,328 | 3/1959 | Bohannon, Jr. | 219/230 |

Primary Examiner—David A. Scherbel
Assistant Examiner—Korie H. Chan
Attorney, Agent, or Firm—Jacobson, Price, Holman & Stern

[57] ABSTRACT

A device for mounting an induced-draft fan pipe on an electric soldering iron which includes a pipe holder fastened to an electric soldering iron by a mounting device for holding a flexible, heat-resisting pipe being connected to an induced-draft fan for removing waste gas and dust from workpieces, the pipe holder having pairs of symmetrical side ribs bilaterally extended from a longitudinal body thereof, the side ribs being bent into respective open-end loops for holding the pipe, the longitudinal body of pipe holder being bent into shape fitting over the soldering bit of the electric soldering iron.

2 Claims, 3 Drawing Sheets

DEVICE FOR MOUNTING AN INDUCED-DRAFT FAN PIPE ON AN ELECTRIC SOLDERING IRON

BACKGROUND OF THE INVENTION

The present invention relates to a device for mounting an induced-draft fan pipe on an electric soldering iron for removing waist gas from workpiece.

An conventional electric soldering iron may be attached with an induced-draft fan pipe for carrying away waste gas and dust from workpieces. The induced-draft fan pipe may be fastened to the electric soldering iron by inserting it through the handle grip of the electric soldering iron for allowing it to be disposed in parallel with the soldering bit of the electric soldering iron. Alternatively, the induced-draft fan pipe may be secured to the connecting iron tube of the electric soldering iron between the soldering bit and the handle grip thereof by a mounting frame. The former induced-draft fan pipe mounting method is not suitable for regular electric soldering irons. Another disadvantage of the former induced-draft fan pipe mounting method is that the handle grip will become hot quickly during the soldering process. The later induced-draft fan pipe is still not satisfactory in use. Because the connecting iron tube holds the electric heating element on the inside, the heat from the electric heating element will be transmitted to the mounting frame and the induced-draft fan pipe during the operation of the electric soldering iron. It is dangerous when the mounting frame is heated. Furthermore, because the induced-draft fan pipe is commonly made from stainless steel, the dust tends to stick to the inside wall of the induced-draft fan pipe, It is not easy to clean the induced-draft fan pipe if its inside wall is adhered with dust. Besides, If the induced-draft fan pipe touches the work piece, the electric circuit or electronic component parts of the work piece may be damaged easily.

SUMMARY OF THE INVENTION

According to one aspect of the present invention, the induced-draft fan pipe mounting device comprises a pipe holder fastened to any of a variety of electric soldering irons by a mounting device to hold an induced-draft fan pipe, wherein the pipe holder comprises pairs of symmetrical side ribs bilaterally extended from a longitudinal body thereof and bent into respective open-end loops for holding the induced-draft fan pipe.

According to another aspect of the present invention, the pipe holder is integrally made from stainless steel and can be bent into any of a variety of configurations fitting over the soldering bit of the electric soldering iron for allowing the induced-draft fan pipe to be disposed at a desired angle spaced from the soldering bit.

According to still another aspect of the present invention, the induced-draft fan pipe is made from a flexible, heat-resisting material which prohibits dust from sticking to the inside wall thereof so that the induced-draft fan pan can be conveniently cleaned. Because the induced-draft fan pipe is made from a flexible, heat-resisting material, the orifice of the induced-draft fan pipe can be conveniently cut to a desired angle to facilitate intake of waste gas and dust, and the induced-draft an pipe does not damage the circuit or component parts of the work pieces when touched.

According to still another aspect of the present invention, the pipe holder can be conveniently fastened to the wooden or plastic shell of front part of the handle grip of electric soldering irons by the mounting device, and therefore heat from the electric heating element of the electric soldering iron does not transmit to the mounting device, and the induced-draft fan pipe.

DETAILED DESCRIPTION OF THE PREFERRED EMBODIMENT

Referring to the annexed drawings in detail, the present invention is generally comprised of an electric soldering iron 1, a mounting device 2, and a pipe holder 3.

Figure 1:
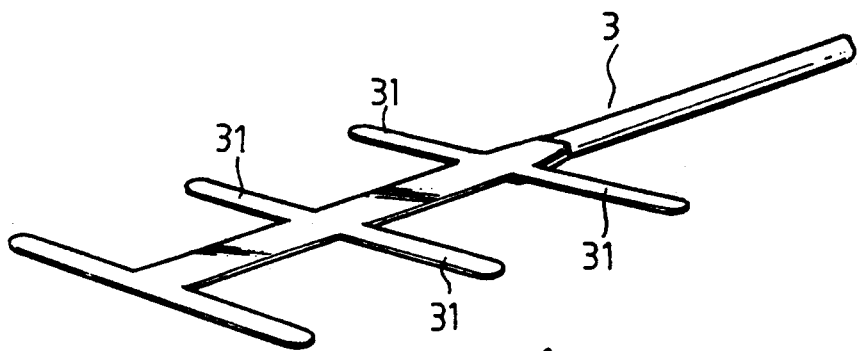
FIG. 1 is a perspective extended out view of a pipe holder according to the present invention.
Figure 2:
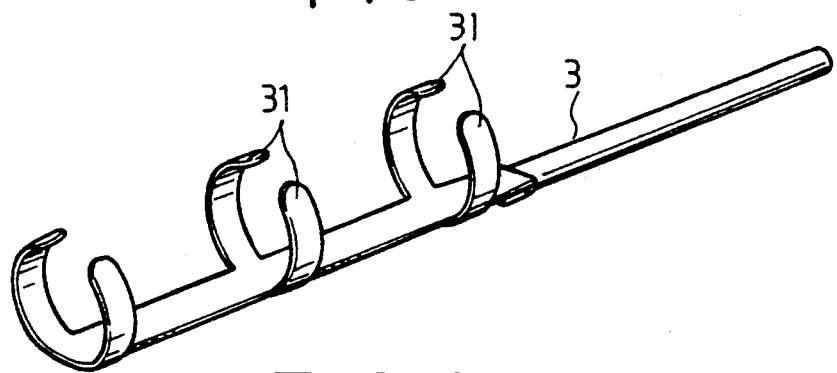
FIG. 2 illustrates the pipe holder bent into one operative form for holding an induced-draft fan pipe.
Figure 3:
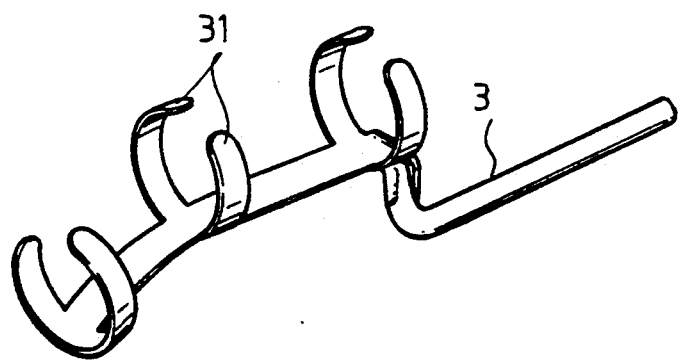
FIG. 3 illustrates the pipe holder bent into another operative form for holding an induced-draft fan pipe.
Figure 4:
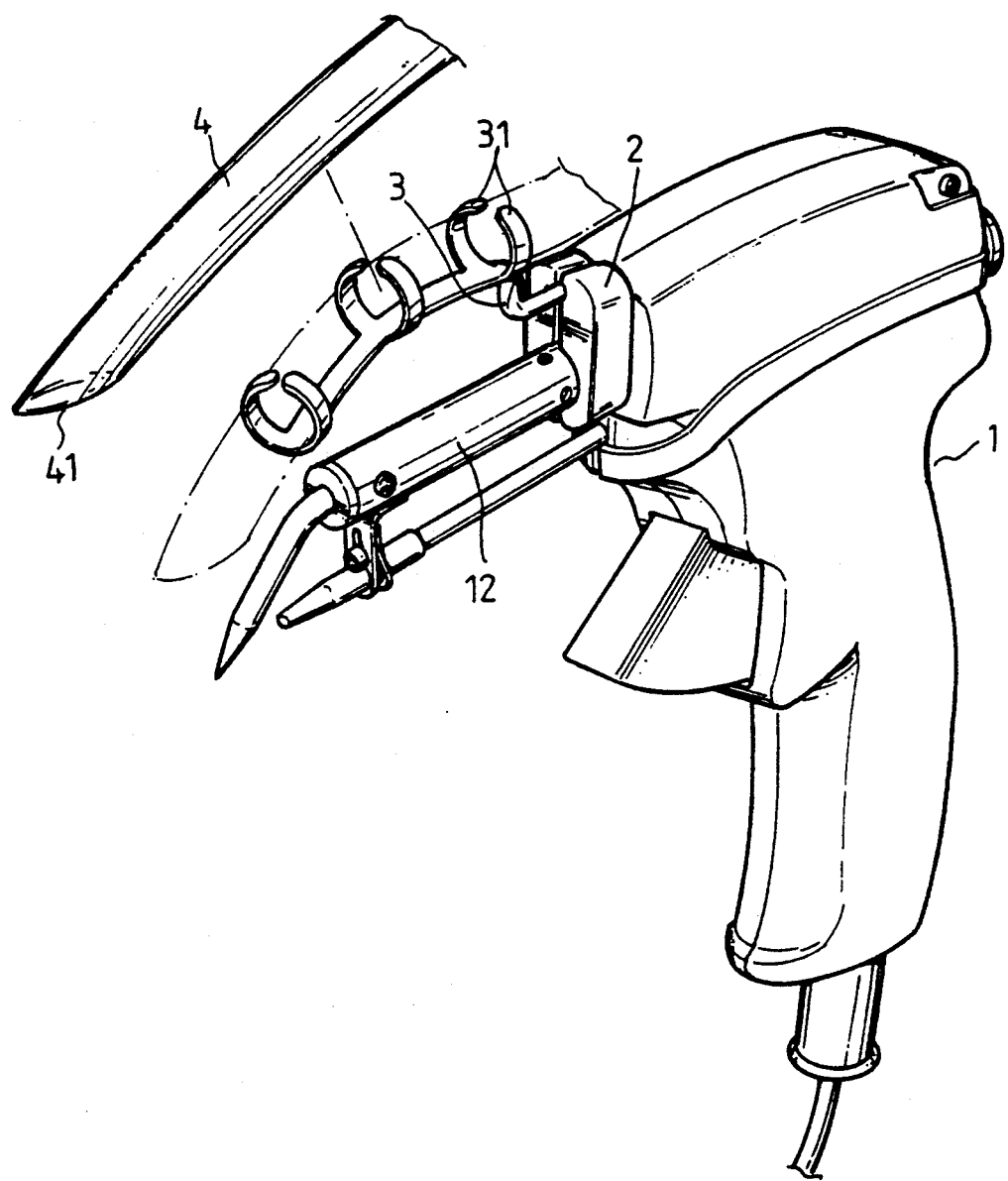
FIG. 4 is an installed view showing the pipe holder fastened to an electric soldering iron to hold an induced-draft fan pipe.
Figure 5:
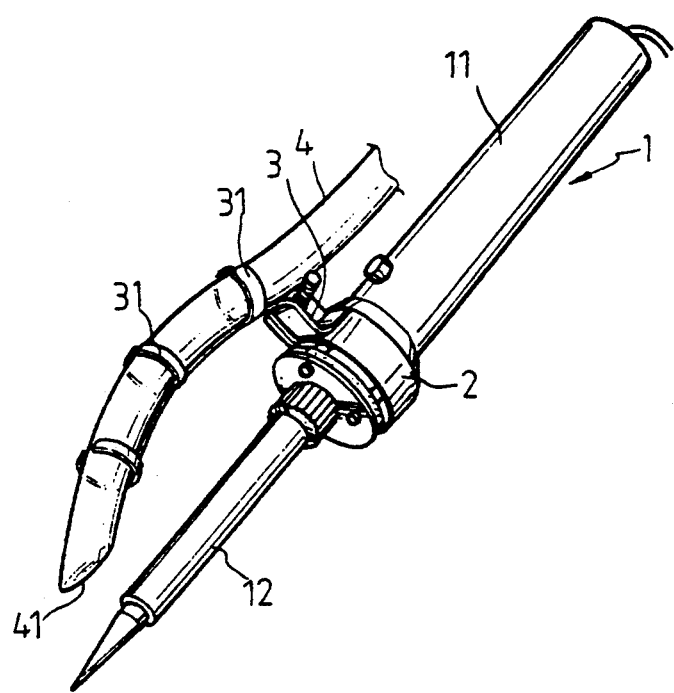
FIG. 5 is another installed view showing the pipe holder fastened to a different type of electric soldering iron to hold an induced-draft fan pipe.

Referring to FIGS. 1, 4 and 5, a mounting device 2 is fastened to an electric soldering iron 1 in front of the handle grip 11 thereof to hold a pipe holder 3 by one side of the soldering bit 12 of the electric soldering iron 1. The pipe holder 3 comprises pairs of symmetrical ribs 31 bilaterally and perpendicularly extended from the longitudinal holder body thereof. The symmetrical ribs 31 of the pipe holder 3 are respectively bent into open-end loops (see FIGS. 2 and 3) for holding an induced-draft fan pipe 4 of an induced-draft fan (not shown).

Referring to FIGS. 4 and 5 again, the pipe holder 3 is made from stainless steel, therefore it can be bent into any of a variety of configurations to fit over the soldering bit 12 of the electric soldering iron 1 to which it is fastened. The induced-draft pipe 4 is made from a flexible, heat-resisting material which prohibits dust and smoke from sticking to the inside wall thereof. Because the induced-draft pipe 4 is made from a flexible material, its orifice 41 can be easily cut to a desired angle by a cutting tool. If the orifice 41 touches the circuit board (workpiece) during the soldering process, it does not damage the circuit or component parts of the circuit board.

As indicated, the present invention provides a device for mounting an induced-draft fan pipe on an electric soldering iron which is simple in structure and inexpensive to manufacture, and which is easy to install. Furthermore, because smoke and dust do not stick to the inside wall of the induced-draft pipe, it is not necessary to frequently clean the induced-draft pipe.

While only one embodiment of the present invention has been shown and described, it will be understood that various modifications and changes could be made without departing from the spirit and scope of the invention.

What is claimed is:

1. A combination comprising an electric soldering iron, a mounting device, and a pipe holder fastened to said electric soldering iron by said mounting device to hold an induced-draft fan pipe for allowing said induced-draft fan pipe to be disposed adjacent a soldering bit of said electric soldering iron, wherein said pipe holder comprises a longitudinal holder body and pairs of symmetrical ribs bilaterally and perpendicularly extended from said body, said pairs of symmetrical ribs being spaced longitudinally along said body and being bent into respective open-end loops for holding said induced-draft fan pipe flexible, heat resisting material.

2. A combination as claimed in claim 1, including an induced-draft fan pipe of a flexible heat resisting material held in said loops.

* * * * *